United States Patent [19]

Nagano

[11] Patent Number: 5,146,363

[45] Date of Patent: Sep. 8, 1992

[54] MICROSCOPE OPTICAL SYSTEM

[75] Inventor: Chikara Nagano, Hachiouji, Japan

[73] Assignee: Olympus Optical Co., Inc., Tokyo, Japan

[21] Appl. No.: 655,772

[22] Filed: Feb. 15, 1991

[30] Foreign Application Priority Data

Feb. 19, 1990 [JP] Japan .................... 2-38035

[51] Int. Cl.$^5$ ............................. G02B 21/36
[52] U.S. Cl. .................... 359/363; 359/368; 359/372
[58] Field of Search ............... 350/507, 508, 517, 522, 350/286, 287, 502, 511; 359/368, 372, 381, 382, 383, 831, 833, 363

[56] References Cited

U.S. PATENT DOCUMENTS 4,518,230  5/1985  Weber .................. 350/511
4,527,869  7/1985  Nihoshi .
4,547,047  10/1985  Koike et al. .
4,643,540  2/1987  Kawasaki et al. ............. 350/502

FOREIGN PATENT DOCUMENTS 3418024  11/1985  Fed. Rep. of Germany .

*Primary Examiner*—Constantine Hannaher
*Assistant Examiner*—Edward J. Glick
*Attorney, Agent, or Firm*—Cushman, Darby & Cushman

[57] ABSTRACT

A microscope optical system having an objective lens, an observing direction converting prism bending a beam of light from the objective lens in a predetermined direction, and an eyepiece for observing an image formed by the beam of light bent in the predetermined direction comprises a first prism having the same bottom angle as the observing direction converting prism, replaceable with respect to the observing direction converting prism, a loop optical path comprised of an odd number of reflecting members for conducting the light beam transmitted by the first prism in the predetermined direction, and a photographic lens provided in the loop optical path. Thus, the microscope optical system has important advantages in practical use that where image recordings are made in photography and video, the field range and the position of a photographic image can be observed as they are through the eyepiece, magnification is variable without rendering the lens barrel large, and the structure is simple with low cost.

8 Claims, 3 Drawing Sheets

MICROSCOPE OPTICAL SYSTEM

BACKGROUND OF THE INVENTION a) Field of the Invention

This invention relates to a microscope optical system adapted to make ordinary observations through a microscope and image recordings through photography or video.

b) Description of the Prior Art

Conventional microscope optical systems of the type, which have such a structure as shown in FIG. 1 by way of example, are constructed so that an imaging beam of light emanating from a specimen $I_1$ and converged by an objective lens 1 is reflected in turn from a half mirror surface 2a and a first surface 2b (the surface normal to the optical axis of the objective lens 1) of an observing direction converting prism 2 to be bent obliquely upward (in an inclined direction) and causes an image $I_2$ to be formed through a barrel prism 3 for observation of the image $I_2$ through an eyepiece 4, while the imaging beam of light transmitted by a photographic prism 5 having a surface 5a parallel with the first surface 2b of the observing direction converting prism 2 and cemented to the half mirror surface 2a of the prism 2 causes an image $I_3$ to be formed, which is reformed, as an image $I_4$, on a film surface 7 through a photographic lens 6 to thereby photograph the image. Although the change of magnification of the photographic image $I_4$ is generally carried out by converting the photographic lens 6 into that with different magnification, this arrangement renders it impossible to observe the photographic image whose magnification is varied and therefore has been improved in such a way that a beam splitter 8 is arranged between the photographic lens 6 and the film surface 7 and splits the imaging light beam traversing the photographic lens 6 to form a image $I_5$ for being observed through a viewer eyepiece 9, thereby allowing the confirmation of the extent of the photographic image, namely, what is called framing, to be performed.

Such a structure, however, has the defect that a user is obliged to change his posture, whenever photography is carried out, in order to shift the position of his eye from the eyepiece 4 to the viewer eyepiece 9.

Hence, as an improvement of this defective structure, the arrangement shown in, for example, FIG. 2, is proposed. Specifically, this arrangement is such that variable magnification lenses 10 and 11 different in magnification from each other are removably disposed in the optical path of the objective lens 1 between the objective lens 1 and the observing direction converting prism 2 in order that the image $I_2$ whose magnification is changed by the variable magnification lenses 10 and 11 is observed through the eyepiece 4, and such that a reflecting prism 12 is disposed to bend the imaging light beam transmitted through the photographic prism 5 for the formation of an image $I_6$, which is reformed, as an image $I_7$, on the film surface 7 by the photographic lens 6 and a reflecting prism 13, thereby allowing the image to be photographed. Here, the photographic lens 6 serves as a relay lens having no variable magnification function. Furthermore, the arrangement is made so that a reticle projecting system is disposed which comprises an illumination light source 14, a focusing plate 15 having a field frame and a reticle, and a reticle projecting lens 16 and whose optical axis coincides with the optical axis bent by the half mirror surface 2a of the observing direction converting prism 2 to form a reticle image at the position of the image $I_2$, thereby enabling the image $I_2$ whose magnification is changed and the reticle image to be observed within the same visual field through the eyepiece 4.

Although the image $I_3$ is depicted in the figure, this merely shows that, if there is the need for automatic focusing detection by way of example, it is only necessary to form the image of an object in the optical path of the light beam transmitted through the reflecting surface of the prism 12, as a semi-transmissive reflecting surface, and therefore the image is not always formed at such a position.

With this arrangement, since the eyepiece 4 functions as a finder, the user does not need to change his posture whenever photography is performed.

The foregoing arrangement, however, has the disadvantage that since the variable magnification lens 10 or 11 is placed between the objective lens 1 and the observing direction converting prism 2, the position for observation becomes high with the result that observation is very difficult. For a zoom lens, the length in the direction of the optical axis is so great that its adoption is impossible in practical use. Further, although such a structure often involves the technique that a scale and a data indicating plate are arranged at the position of the image $I_6$ and their images are photographed, together with the image $I_7$, on the film surface 7, it has the defect that the positions of their photographed images cannot be viewed through the eyepiece 4. Moreover, in the structure, the field frame observed through the eyepiece 4 is bright against the background, namely, assumes a so-called bright frame. This, however, brings about the defect that where the image of the background is bright, the frame is extremely difficult of view.

Thus, as a technique to solve the preceding problem of the bright frame, the optical system, for example, set forth in U.S. Pat. No. 4,527,869, is proposed, which as shown in FIG. 3, comprises: a quadrilateral prism P having a first surface $S_1$ and a second surface $S_2$ normal to the optical axis of an objective lens $L_1$ and a third surface $S_3$ and a fourth surface $S_4$ parallel with the surface on the eyepiece side of the observing direction converting prism, arranged to be replaceable with respect to the observing direction converting prism; a loop optical path comprised of first, second and third reflecting members $M_1$, $M_2$ and $M_3$, arranged in the plane including the optical axis of the objective lens $L_1$ so that a light beam transmitted by the first surface $S_1$ and the second surface $S_2$ of the quadrilateral prism P is reflected in turn from the reflecting members to be incident on the third surface $S_3$ of the quadrilateral prism P, followed by successive reflections from the second surface $S_2$ and the first surface $S_1$, and coincides with the optical axis directed toward the eyepiece $L_{10}$; a lens system $L_4$ arranged in the loop optical path to reform an image formed by the objective lens; and a focusing plate $P_3$ arranged at the position of the image $I_1$ in the loop optical path, to take out the light beam for photography by arranging removably the second reflecting member $M_2$ in a photographic optical path.

In this structure, however, the disadvantage is caused that, in ordinary image observation and photographic image confirmation, the subtraction between the numbers of times of reflections to which the light beam is subjected from the objective lens to the eyepiece gives an odd number, so that, in order to render the orientations of both images equal, the use of a Dach prism is required for the third reflecting member $M_3$ with resultant complication of arrangement and high cost. Furthermore, if the arrangement is such that the photographic lens $L_7$ is positioned between the first reflecting member $M_1$ and the second reflecting member $M_2$ and used as the zoom lens in order to enable the magnification to be changed without rendering the position for observation high and enable its situation to be viewed, the third reflecting member $M_3$ will be positioned on a considerably lower side as it is farther away from the optical axis of the objective lens $L_1$, with the result that bulky size of the lens barrel is inevitably brought about and the unity of the photographic device also becomes difficult.

Thus, as a measure of solving the preceding problem of the bulky size of the lens barrel, the optical system, for example, set forth in U.S. Pat. No. 4,547,047, is proposed, which is constructed to render an imaging light beam passing through a photographic lens incident on the side of a prism of a Jentzsch type lens barrel through a loop optical path comprised of a plurality of reflecting members arranged in a plane normal to the optical axis of an objective lens. With this structure, however, the loop optical system fails to be included in the same plane as the optical axis of the objective lens and it is therefore required that an arrangement is made so that an image with no inclination can be observed. Although, for this reason, an image rotating optical system is proposed, it also has the defect that the structure is complicated with the resultant high cost. Moreover, the structure has another defect that the optical system is not applicable to a Siedentopf type lens barrel in which the angle subtended by the optical axis on the side of the prism of the lens barrel varies in interpupil distance adjustment. Thus, any of the conventional microscope optical systems capable of photographing the image has both merits and demerits and fails to fulfil the requirements that the size is small to be easily used and the structure is simple.

SUMMARY OF THE INVENTION

It is, therefore, the object of the present invention to provide a microscope optical system capable of making image recordings through photography and video photography in which ordinary observation and finder observation in photography can be performed through the same eyepiece, with a compact size and a simple structure.

The microscope optical system according to the present invention comprises: an objective lens; an observing direction converting prism removably arranged in the optical path of the objective lens, bending a beam of light from the objective lens in a predetermined direction; an eyepiece arranged in the optical path of the beam of light bent by the observing direction converting prism; a first prism having first and second surfaces normal to the optical axis of the objective lens and third and fourth surfaces making the same bottom angle as the surface on the eyepiece side of the observing direction converting prism with the first surface and disposed to be replaceable with respect to the observing direction converting prism; and an odd number of reflecting members comprised of a first reflecting member directing laterally the beam of light transmitted by the first and second surface of the first prism in a plane including the optical axis of the objective lens and a second reflecting member disposed in the optical path of the beam of light bent by the first reflecting member to direct downward the optical path, for forming a loop optical path introducing the beam of light so that the beam of light passes through the plane including the optical axis of the objective lens to be incident on the fourth surface of the first prism.

According to one aspect of the present invention, the microscope optical system is constructed so that one of the odd number of reflecting members is a semi-transmissive reflecting member, an image recording device is disposed in the optical path of the light beam transmitted by the semi-transmissive reflecting member, a photographic lens is arranged in the optical path from the first prism to the image recording device, and the light beam emerging from the loop optical path is reflected an odd number of times in the first prism and introduced into the eyepiece.

According to another aspect of the present invention, the microscope optical system is such that one of the odd number of reflecting members, located behind the first reflecting member, is removably disposed in the optical path and an image recording device is disposed in a transmission optical path formed when the one reflecting member is removed from the optical path.

According to a further aspect of the present invention, the microscope optical system includes third, fourth and fifth reflecting members in the optical path bent by the second reflecting member, a focusing plate arranged in the optical path from the second reflecting member to the first prism, and a projecting lens for projecting the focusing plate at the object focal point of the eyepiece.

According to the structures mentioned above, the photographic lens is provided in the loop optical path which coincides finally with the optical axis of the eyepiece, so that the field range of the photographic image recorded in the photograph and video can be viewed as it is through the eyepiece. Furthermore, since the arrangement is made so that the loop optical path is comprised of an odd number of reflecting members and the number of times of reflections in the first prism is odd, it follows that the light beam from the loop optical system is incident, obliquely downward, on the first prism. Thus, the optical elements constituting the loop optical path do not largely protrude downward and the microscope optical system can be designed for small size. Also, in the ordinary image observation and the photographic image confirmation, the subtraction between the numbers of times of reflections to which the light beam is subjected from the objective lens to the eyepiece gives an even number, so that the orientations of both images can be rendered to coincide with each other without using the Dach prism. Further, because of the presence of the loop optical path in the same plane as the optical axis of the objective lens, the image with no inclination can be observed without the image rotating optical system.

This and other objects as well as the features and the advantages of the present invention will become apparent from the following detailed description of the preferred embodiments when taken in conjunction with the accompanying drawings.

DESCRIPTION OF THE PREFERRED EMBODIMENTS

Figure 1:
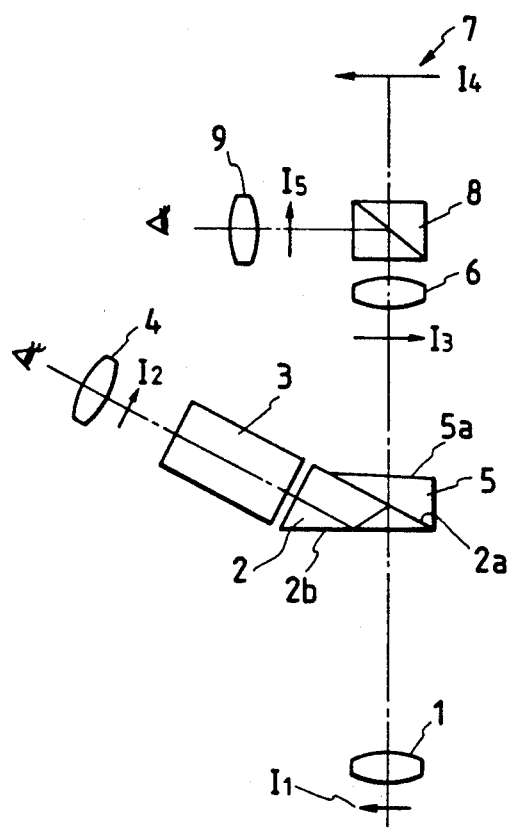
FIG. 1 is a view showing the structure of a conventional example of a microscope optical system.
Figure 2:
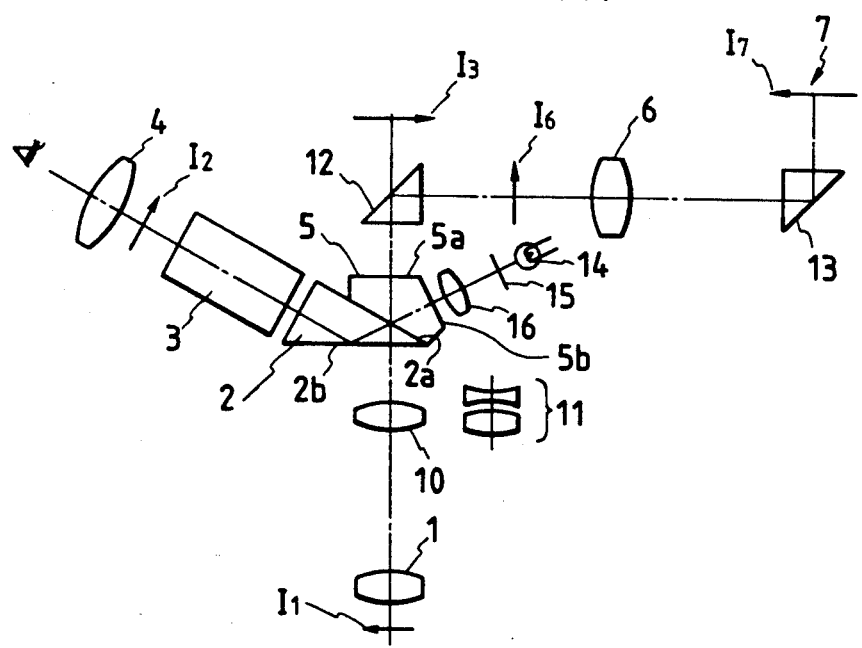
FIGS. 2 and 3 are views showing the structures of other conventional examples.
Figure 3:
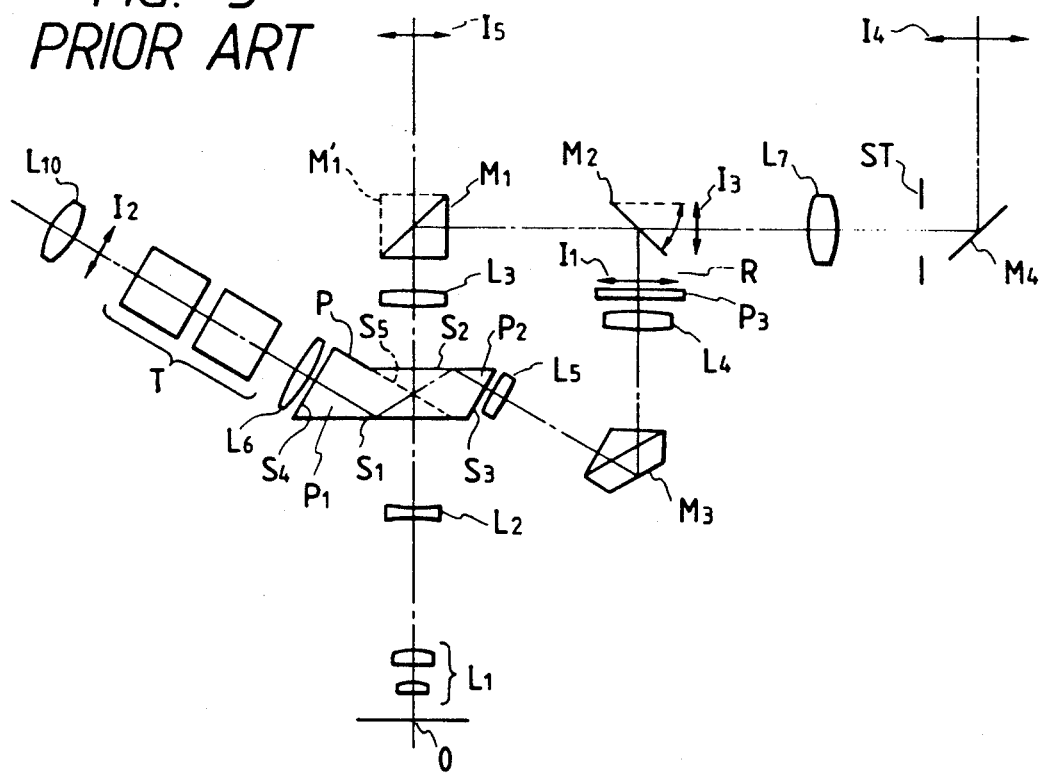

Referring now to the embodiments shown in the drawings, in which like numerals indicate like members, the present invention will be described in detail.

Figure 4:
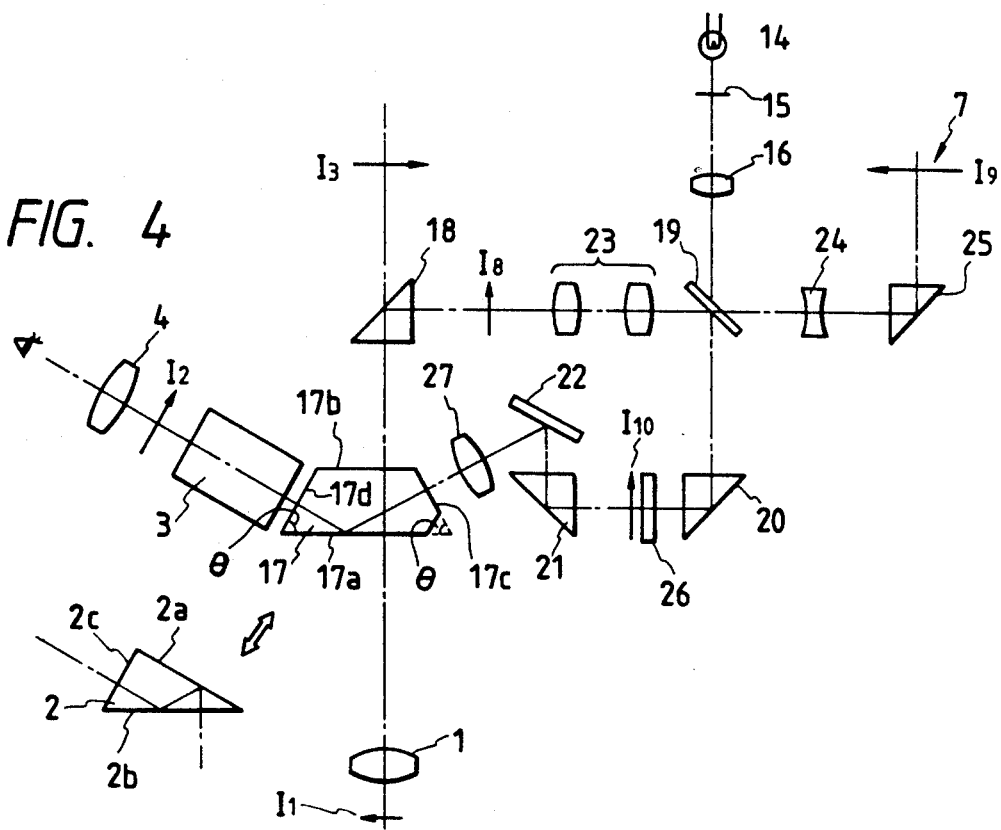
FIG. 4 is a view showing the structure of a first embodiment of a microscope optical system according to the present invention.

FIG. 4 shows the structure of a first embodiment of the present invention, in which reference numeral 17 represents a prism having a first surface 17a and a second surface 17b normal to the optical axis of the objective lens 1 and a third surface 17c and a fourth surface 17d each making a bottom angle θ which is the same as in the surface 2c of the observing direction converting prism 2 directed toward the barrel lens 3 with the first surface 17a, and disposed to be capable of being replaced with the observation converting prism 2. Reference numerals 18, 19, 20, 21, and 22 denote a reflecting prism, a half mirror, a reflecting prism, a reflecting prism, and a mirror, respectively, arranged in a plane including the optical axis of the objective lens 1 to constitute a loop optical path so that a beam of light transmitted through the first surface 17a and the second surface 17b is reflected in turn to be incident on the third surface 17c of the prism 17, followed by reflection from the first surface 17a, and coincides with the optical axis directed toward the eyepiece 4. Reference numeral 23 denotes a photographic lens arranged between the reflecting prism 18 and the half mirror 19, which is adapted to reform an image $I_8$ formed by the objective lens 1, as an image $I_9$, on the film surface 7 through a relay lens 24 having a negative power and a reflecting prism 25 both arranged on the exit side of the half mirror 19 and, as an image $I_{10}$, in the loop optical path through the half mirror 19 and the reflecting prism 20. The photographic lens 23 is such that it can be replaced with several types of lenses different in magnification or converted into a zoom lens system, thereby changing its magnification. The relay lens 24 is adapted to increase the magnification of the image $I_9$ with respect to the image $I_{10}$ because the image $I_9$ formed on the film surface 7 needs to be magnified at least twice as compared with the image $I_{10}$ observed through the eyepiece 4. The reflecting prism 25 is provided so that the image $I_9$ may not be formed as a mirror image. Reference numeral 26 denotes a focusing plate arranged at the position of the image $I_{10}$ or adjacent thereto and 27 denotes a relay lens arranged between the mirror 22 and the third surface 17c of the prism 17, reforming the image $I_{10}$ as the image $I_2$ observed through the eyepiece 4. Also, reference numeral 14 represents the illumination light source, 15 the indicating member indicative of the information such as dates, and 16 the projecting lens, which is such that a part of the light from the indicating member 15 is reflected by the half mirror 19 and imaged on the film surface 7 through the relay lens 24 for data photography, while the other is rendered incident on the loop optical path through the half mirror 19 and imaged on the focusing plate 26 like the object image. In TV photography, instead of the film surface 7, the image receiving surface of a pickup tube is arranged at the same position.

This embodiment is constructed as the foregoing and in the ordinary observation, the observing direction converting prism 2 is employed instead of the prism 17, so that the imaging light beam emanating from the specimen $I_1$ and converged by the objective lens 1, after being reflected by the first surface 2a and the second surface 2b of the prism 2, emerges from the surface 2c to be formed as the image $I_2$ through the barrel prism 3 and the image $I_2$ is observed through the eyepiece 4. In this instance, since the number of times of reflections in the optical path is small, the image $I_2$ comes to an image with good quality.

Also, when the image recording is made through the photography or video, the prism 17 is employed in place of the observing direction converting prism 2. Accordingly, the imaging light beam emanating from the specimen $I_1$ and converged by the objective lens 1, after passing through the first surface 17a and the second surface 17b of the prism 17, is bent directionally by the reflecting prism 18 and causes the image $I_8$ to be formed, which is reformed, as the image $I_9$, on the film surface 7 through the relay lens 24 and the reflecting prism 25 by the photographic lens 23 and, as the image $I_{10}$, on the focusing plate 26 through the half mirror 19 and the reflecting prism 20. Further, the light beam from the image $I_{10}$, after being reflected from the reflecting prism 21 and the mirror 22, is imaged, as the image $I_2$, through the first surface 17a of the prism 17 and the barrel prism 3 by the relay lens 27 so that the image $I_2$ is observed through the eyepiece 4.

According to the structure mentioned above, because the photographic lens 23 with variable magnification is provided in the loop optical path which coincides eventually with the optical axis of the eyepiece 4, the field range of the photographic image varying in magnification, recorded in the photograph and video, can be observed as it is through the eyepiece 4. Furthermore, the number of reflecting members constituting the loop optical path is set to an odd number and the number of times of reflections in the first prism is also set to an odd number, so that the reflecting members constituting the loop optical path do not largely protrude downward and the microscope optical system can be rendered compact. Also, in the ordinary image observation and the photographic image confirmation, the numbers of times of reflections to which the light beam is subjected from the objective lens 1 to the eyepiece 4 are two and six, respectively, and the subtraction between them gives an even number, so that the orientations of both images can be rendered to coincide with each other without using the Dach prism. Further, because the loop optical system lies in the same plane as the optical axis of the objective lens 1, the image with no inclination can be observed without the image rotating optical system. Although any number of reflecting members constituting the loop optical system will do if it is odd, a large number of reflecting members is unfavorable, because the number of times of reflections in the optical path increases and the picture quality of the final image $I_2$ deteriorates.

The focusing plate 26 is arranged at the position of the image (image $I_{10}$) in the loop optical system or adjacent thereto, with the result that the position of photographed data can be viewed as it is through the eyepiece 4. Also, if the arrangement is made so that the size of the field frame provided in the focusing plate 26 corresponds to that of the film surface 7, the determination of the photographic range, namely, the so-called framing, will be performed with great ease. Incidentally, the focusing plate 26 having a scale may well be provided at the imaging position (the position of the image $I_8$) brought about by the objective lens 1 and in such a case, observation can be made without changing the relative size between the photographic image and the scale. In such an instance, it is necessary only to provide the optical system for data indication on the left side of the prism 18 so that varied information is rendered to enter into the optical path through the reflecting surface.

Instead of the half mirror 19, a half prism or a quick-return mirror may also be employed and, of these elements, the latter is such that the brightness of either of the photographic image and the observing image is not reduced. In this instance also, if the arrangement is made so that the optical system for data indication, like the case where the focusing plate 26 is disposed at the position of the image $I_8$, is provided on the left side of the prism 18, the data to be photographed can be viewed through the finder.

Figure 5:
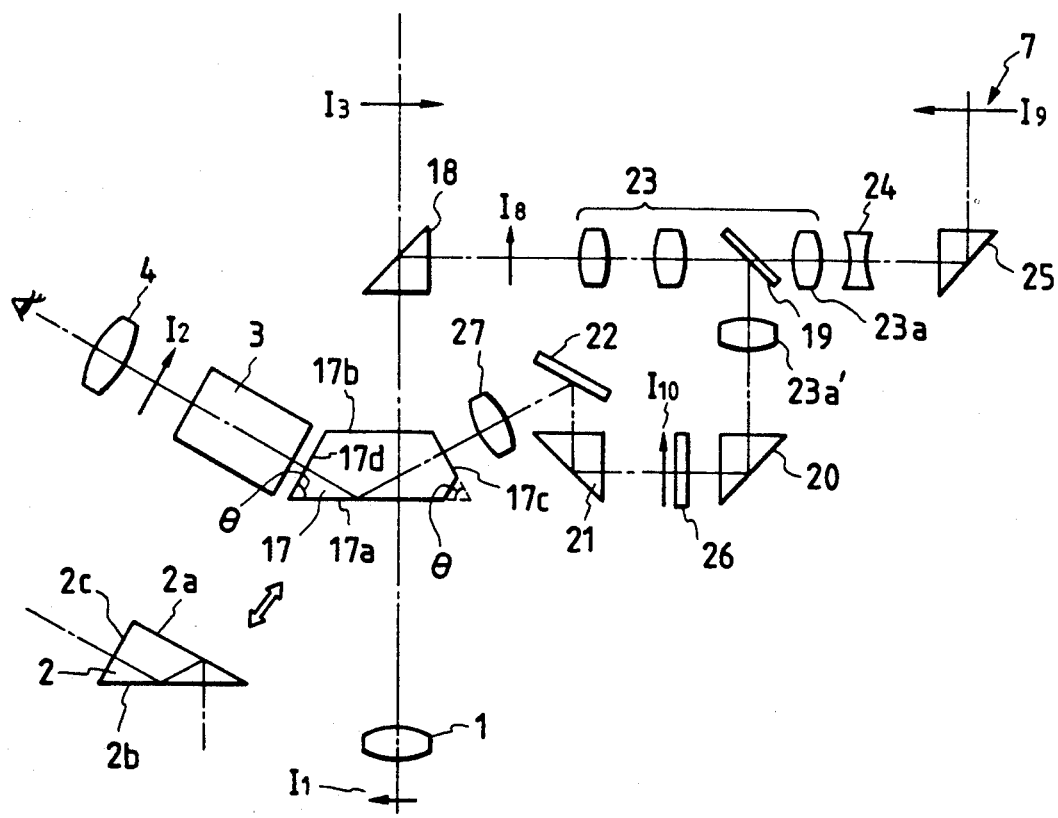
FIG. 5 is a view showing the structure of a second embodiment thereof.

By the way, in the first embodiment, the space between the reflecting prism 18 and the half mirror 19 is in some degree limited so as not to render the microscope bulky. For this reason, it is substantially difficult that the photographic lens 23 is constructed by a multilens component such as two lens components or three lens components in order to raise a variable magnification ratio and enhance imaging performance. Accordingly, if the photographic lens 23, like a second embodiment shown in FIG. 5, is constructed by, for example, three components in which the half mirror 19 is sandwiched between two components, and lenses 23a and 23a' having the same power as a third component are arranged between the half mirror 19 and the relay lens 24 and between the half mirror 19 and the reflecting prism 20, respectively, the embodiment will have the advantage that the spaces between the half mirror 19 and the relay lens 24 and between the half mirror 19 and the reflecting prism 20 can be effectively utilized without any uselessness. Where the photographic lens 23 is a zoom lens, the lenses 23a and 23a' have the same moving locus.

Furthermore, since the embodiment has the relay lens 24, the lenses 23a and 23a' may not necessarily be constructed to have the same power. If the lenses 23a and 23a' are designed so as to be replaceable with respect to other lenses different in magnification, a more abundant variable magnification effect will be secured.

What is claimed is:

1. A microscope optical system, comprising:
   an objective lens;
   an observing direction converting prism removably arranged in an optical path of said objective lens for bending a beam of light transmitted by said objective lens in a predetermined direction through an even number of times of internal reflections;
   an eyepiece arranged in an optical path of the beam of light bent by said observing direction converting prism;
   a second prism having a first surface perpendicular to an optical axis of said objective lens, a second surface opposite to the first surface, a third surface defining a bottom angle with said first surface, said bottom angle being equal to an angle of a surface of said observing direction converting prism directed toward said eyepiece with the first surface, and a fourth surface opposite to the third surface, removably disposed alternatively at a position substantially equivalent to that of said observing direction converting prism;
   an odd number of reflecting members comprised of a first reflecting member directing laterally the beam of light transmitted by the first surface and the second surface of said second prism in a plane including the optical axis of said objective lens and a second reflecting member disposed in an optical path of the beam of light bent by the first reflecting member to direct downward the optical path, for forming a loop optical path introducing the beam of light so that after the downward directed optical path is once raised above the fourth surface of said second prism in the plane including the optical axis of said objective lens, the beam of light is obliquely downward incident through the fourth surface on said second prism,
   one of said odd number of reflecting members being a semi-transmissive reflecting member and image recording means being disposed in an optical path of the beam of light transmitted through said semi-transmissive reflecting member,
   an image of an object through said objective lens being formed in front of said semi-transmissive reflecting member,
   said object image being reformed in an optical path bent behind said semi-transmissive reflecting member by a relay lens, and
   a photographic lens in an optical path from said second prism to said image recording means,
   the beam of light emerging from the loop optical path being reflected an odd number of times in said second prism for introduction into said eyepiece.

2. A microscope optical system, comprising:
   an objective lens;
   an observing direction converting prism removably arranged in an optical path of said objective lens for bending s beam of light transmitted by said objective lens in a predetermined direction through an even number of times of internal reflections;
   an eyepiece arranged in an optical path of the beam of light bent by said observing direction converting prism;
   a second prism having a first surface perpendicular to an optical axis of said objective lens, a second surface opposite to the first surface, a third surface defining a bottom angle with said first surface, said bottom angle being equal to an angle of a surface of said observing direction converting prism directed toward said eyepiece with the first surface, and a fourth surface opposite to the third surface, removably disposed alternatively at a position substantially equivalent to that of said observing direction converting prism;
   an odd number of reflecting members comprised of a first reflecting member directing laterally the beam of light transmitted by the first surface and the second surface of said second prism in a plane including the optical axis of said objective lens and a second reflecting member disposed in an optical path of the beam of light bent by the first reflecting member to direct downward the optical path, for forming a loop optical path introducing the beam of light so that after the downward directed optical path is once raised above the fourth surface of said second prism in the plane including the optical axis of said objective lens, the beam of light is obliquely downward incident through the fourth surface on said second prism, one of said odd number of reflecting members located behind the first reflecting member of said odd number of reflecting members being removably disposed in an optical path and image recording means being disposed in a transmission optical path formed when said removably disposed reflecting member is removed from the optical path, an image of an object through said objective lens being formed in front of said removably disposed reflecting member, said object image being reformed behind said removably disposed reflecting member by a relay lens, and a photographic lens in an optical path from said second prism to said image recording means, the beam of light emerging from the loop optical path being reflected an odd number of times in said second prism for introduction into said eyepiece.

3. A microscope optical system, comprising:

an objective lens;

an observing direction converting prism removably arranged in an optical path of said objective lens for bending a beam of light transmitted by said objective lens in a predetermined direction through an even number of times of internal reflections;

an eyepiece arranged in an optical path of the beam of light bent by said observing direction converting prism;

a second prism having a first surface perpendicular to an optical axis of said objective lens, a second surface opposite to the first surface, a third surface defining a bottom angle with said first surface said bottom angle equal to an angle of a surface of said observing direction converting prism directed toward said eyepiece with the first surface, and a fourth surface opposite to the third surface, removably disposed alternatively at a position substantially equivalent to that of said observing direction converting prism;

an odd number of reflecting members comprised of a first reflecting member directing laterally the beam of light transmitted by the first surface and the second surface of said second prism in a plane including the optical axis of said objective lens and a second reflecting member disposed in an optical path of the beam of light bent by the first reflecting member to direct downward the optical path, for forming a loop optical path introducing the beam of light so that the beam of light is incident through the fourth surface on said second prism in the plane including the optical axis of said objective lens, one of said odd number of reflecting members being a semi-transmissive reflecting member and image recording means being disposed in an optical path of the beam of light transmitted through said semi-transmissive reflecting member, an image of an object through said objective lens being formed in front of said semi-transmissive reflecting member, said object image being reformed in an optical path bent behind said semi-transmissive reflecting member by a relay lens, and a photographic lens in an optical path from said second prism to said image recording means, the beam of light emerging from the loop optical path being reflected an odd number of times in said second prism for introduction into said eyepiece.

4. A microscope optical system, comprising:

an objective lens;

an observing direction converting prism removably arranged in an optical path of said objective lens for bending a beam of light transmitted by said objective lens in a predetermined direction through an even number of times of internal reflections;

an eyepiece arranged in an optical path of the beam of light bent by said observing direction converting prism;

a second prism having a first surface perpendicular to an optical axis of said objective lens, a second surface opposite to the first surface, a third surface defining a bottom angle with said first surface, said bottom angle equal to an angle of a surface of said observing direction converting prism directed toward said eyepiece with the first surface, and a fourth surface opposite to the third surface, removably disposed alternatively at a position substantially equivalent to that of said observing direction converting prism;

an odd number, greater than one, of reflecting members comprised of a first reflecting member directing laterally the beam of light transmitted by the first surface and the second surface of said second prism in a plane including the optical axis of said objective lens and a second reflecting member disposed in an optical path of the beam of light bent by the first reflecting member to direct downward the optical path, for forming a loop optical path introducing the beam of light so that the beam of light is incident through the fourth surface on said second prism in the plane including the optical axis of said objective lens, one of said odd number of reflecting members located behind the first reflecting member of said odd number of reflecting members being removably disposed in an optical path, an image recording means disposed in a transmission optical path formed when said removably disposed reflecting member is removed from the optical path, an image of an object through said objective lens being formed in front of said removably disposed reflecting member, said object image being reformed in an optical path bent behind said removably disposed reflecting member by a relay lens, and a photographic lens in an optical path from said second prism to said image recording means, the beam of light emerging from the loop optical path being reflected an odd number of times in said second prism for introduction into said eyepiece.

5. The microscope optical system according to claims 1, 2 or 4, wherein third, fourth and fifth reflecting members are disposed in an optical path of the beam of light bent by said second reflecting member, a focusing plate is arranged in an optical path from said second reflecting member to said first prism, and a projecting lens for projecting the focusing plate at a front focal point of said eyepiece is disposed.

6. The microscope optical system according to claim 5, wherein said photographic lens is comprised of a plurality of lens units and said second reflecting member is arranged within said photographic lens.

7. The microscope optical system according to claim 5, wherein third, fourth, and fifth reflecting members are disposed in an optical path of the beam of light bent by said second reflecting member, said third reflecting member bending laterally the optical path so as to approach the optical axis of said objective lens, said fourth reflecting member bending upwardly the optical path, and said firth reflecting member bending the optical path so that the beam of light is obliquely downward incident on said second prism.

8. The microscope optical system according to claim 2, wherein said photographic lens is a variable focal length lens.

* * * * *

UNITED STATES PATENT AND TRADEMARK OFFICE
CERTIFICATE OF CORRECTION

PATENT NO. : 5,146,363
DATED : September 8, 1992
INVENTOR(S) : Chikara NAGANO

It is certified that error appears in the above-identified patent and that said Letters Patent is hereby corrected as shown below:

On the title page: Item

"(73) Assignee: OLYMPUS OPTICAL CO., INC., . . ."

TO

--(73) Assignee: OLYMPUS OPTICAL CO., LTD. . . .---

Signed and Sealed this

Seventh Day of December, 1993

Attest:

BRUCE LEHMAN

*Attesting Officer*    *Commissioner of Patents and Trademarks*